(12) United States Patent
Steuer et al.

(10) Patent No.: US 10,928,177 B2
(45) Date of Patent: Feb. 23, 2021

(54) MEASURING APPARATUS FOR SURFACE OR CONTOUR MEASUREMENT

(71) Applicant: JENOPTIK Industrial Metrology Germany GmbH, Villingen-Schwenningen (DE)

(72) Inventors: Philipp Steuer, Trossingen (DE); Wolfgang Speck, Villingen-Schwenningen (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 157 days.

(21) Appl. No.: 16/273,501

(22) Filed: Feb. 12, 2019

(65) Prior Publication Data
US 2019/0249975 A1    Aug. 15, 2019

(30) Foreign Application Priority Data
Feb. 15, 2018  (DE) ..................... 10 2018 103 420.2

(51) Int. Cl.
*G01B 5/016*    (2006.01)
(52) U.S. Cl.
CPC .................................. *G01B 5/016* (2013.01)
(58) Field of Classification Search
CPC ................................ G01B 5/016; G01B 5/20
USPC ........................................................ 33/503
See application file for complete search history.

(56) References Cited

U.S. PATENT DOCUMENTS

| 4,397,188 A | * | 8/1983 | Bansevichus | .......... | G01B 7/012 |
| | | | | | 33/561 |
| 4,574,625 A | | 3/1986 | Olasz et al. | | |
| 5,028,901 A | | 7/1991 | Enderle et al. | | |
| 5,394,757 A | | 3/1995 | Workman et al. | | |
| 5,435,072 A | * | 7/1995 | Lloyd | .................... | G01B 7/002 |
| | | | | | 33/559 |
| 6,073,360 A | | 6/2000 | Struble | .................... | G01B 5/14 |
| | | | | | 33/783 |
| 6,490,912 B1 | | 12/2002 | Volk | | |

(Continued)

FOREIGN PATENT DOCUMENTS

| DE | 33 20 127 A1 | 6/1983 |
| DE | 39 22 296 A1 | 7/1989 |

(Continued)

*Primary Examiner* — George B Bennett
(74) *Attorney, Agent, or Firm* — Shlesinger, Arkwright & Garvey LLP

(57) ABSTRACT

Measuring apparatus for surface or contour measurement on a workpiece has a probe for contacting the surface of workpiece to be measured. Probe has a holding part to which a probe arm is detachably connectable or connected. Measuring apparatus also has a feed apparatus for moving probe relative to workpiece to be measured, and a control apparatus for controlling feed apparatus. A position sensor associated with probe arm and connected to control apparatus is provided, and which detects changes in the position of the probe arm, relative to holding part, from a measuring position into an interference position of probe arm, and generates a position change signal. Control apparatus is designed and programmed in such a way that, as a response to a position change signal, it generates a control signal for controlling feed apparatus in such a way that feed movement of probe is influenced.

16 Claims, 4 Drawing Sheets

(56) References Cited

U.S. PATENT DOCUMENTS

| | | | |
|---|---|---|---|
| 7,055,367 B2 | 6/2006 | Hajdukiewicz | G01B 21/042 33/501.02 |
| 7,155,839 B2 | 1/2007 | Schopf | |
| 8,006,398 B2 | 8/2011 | McFarland | G05B 19/401 33/503 |
| 8,334,971 B2 | 12/2012 | Keller et al. | |
| 8,336,224 B2 | 12/2012 | Arnold | |
| 8,429,829 B2 | 4/2013 | Arnold | |
| 8,508,743 B2 | 8/2013 | Keller et al. | |
| 8,524,523 B2 | 9/2013 | Park | |
| 8,725,446 B2 | 5/2014 | Wegmann | |
| 8,973,280 B2 | 3/2015 | Seewig | |
| 9,261,359 B2 | 2/2016 | DeCool | |
| 9,393,663 B2 | 7/2016 | Volk | |
| 9,395,310 B2 | 7/2016 | Rudolf | |
| 9,562,756 B2 | 2/2017 | Seewig | |
| 9,683,914 B2 | 6/2017 | Dietz et al. | |
| 9,816,811 B2 | 11/2017 | Riester | |
| 9,879,969 B2 | 1/2018 | Volk | |
| 9,983,149 B2 | 5/2018 | Rudolf | |
| 10,330,915 B2 | 6/2019 | Rudolf | |
| 10,408,597 B2 | 9/2019 | Volk | |
| 10,480,965 B2 | 11/2019 | Volk | |
| 2004/0231177 A1 | 11/2004 | Mies | G01B 5/004 33/503 |
| 2008/0148590 A1 | 6/2008 | Hayashi | G01B 11/24 33/710 |
| 2009/0007450 A1* | 1/2009 | Liu | G01B 3/008 33/556 |
| 2009/0133277 A1* | 5/2009 | Tanaka | G01B 7/016 33/558 |
| 2010/0132432 A1* | 6/2010 | Wallace | G01B 21/045 73/1.75 |
| 2012/0043961 A1* | 2/2012 | Volk | B24B 5/42 324/207.25 |
| 2013/0047452 A1 | 2/2013 | McMurtry | G01B 5/012 33/503 |
| 2014/0208877 A1* | 7/2014 | Speck | G01B 21/047 73/866.5 |
| 2014/0223751 A1* | 8/2014 | Alxneit | G01B 5/004 33/503 |
| 2016/0153767 A1 | 6/2016 | Ihlenfeldt | G01C 3/08 33/503 |
| 2016/0195389 A1* | 7/2016 | Sagemueller | G05B 19/401 33/503 |
| 2019/0077076 A1 | 3/2019 | O'Hare | G01B 5/0007 |
| 2019/0101371 A1* | 4/2019 | Steuer | G01B 21/047 |

FOREIGN PATENT DOCUMENTS

| | | |
|---|---|---|
| DE | 42 17 641 A1 | 5/1992 |
| DE | 44 37 033 C2 | 10/1994 |
| DE | 195 02 840 A1 | 1/1995 |
| DE | 196 17 023 C1 | 4/1996 |
| DE | 10 2005 036 928 B3 | 8/2005 |
| DE | 10 2007 018 444 B3 | 4/2007 |
| DE | 10 2012 007 183 A1 | 4/2012 |
| EP | 0 406 781 B1 | 7/1990 |
| EP | 0 750 017 A2 | 12/1996 |
| EP | 1 289 317 A1 | 3/2003 |
| EP | 1 722 189 A1 | 2/2006 |
| EP | 1 689 317 A1 | 8/2006 |
| EP | 2 762 827 B1 | 1/2014 |
| WO | WO 02/27270 A1 | 4/2002 |
| WO | WO 03/083407 A1 | 10/2003 |
| WO | WO 2005/053567 A1 | 6/2005 |

* cited by examiner

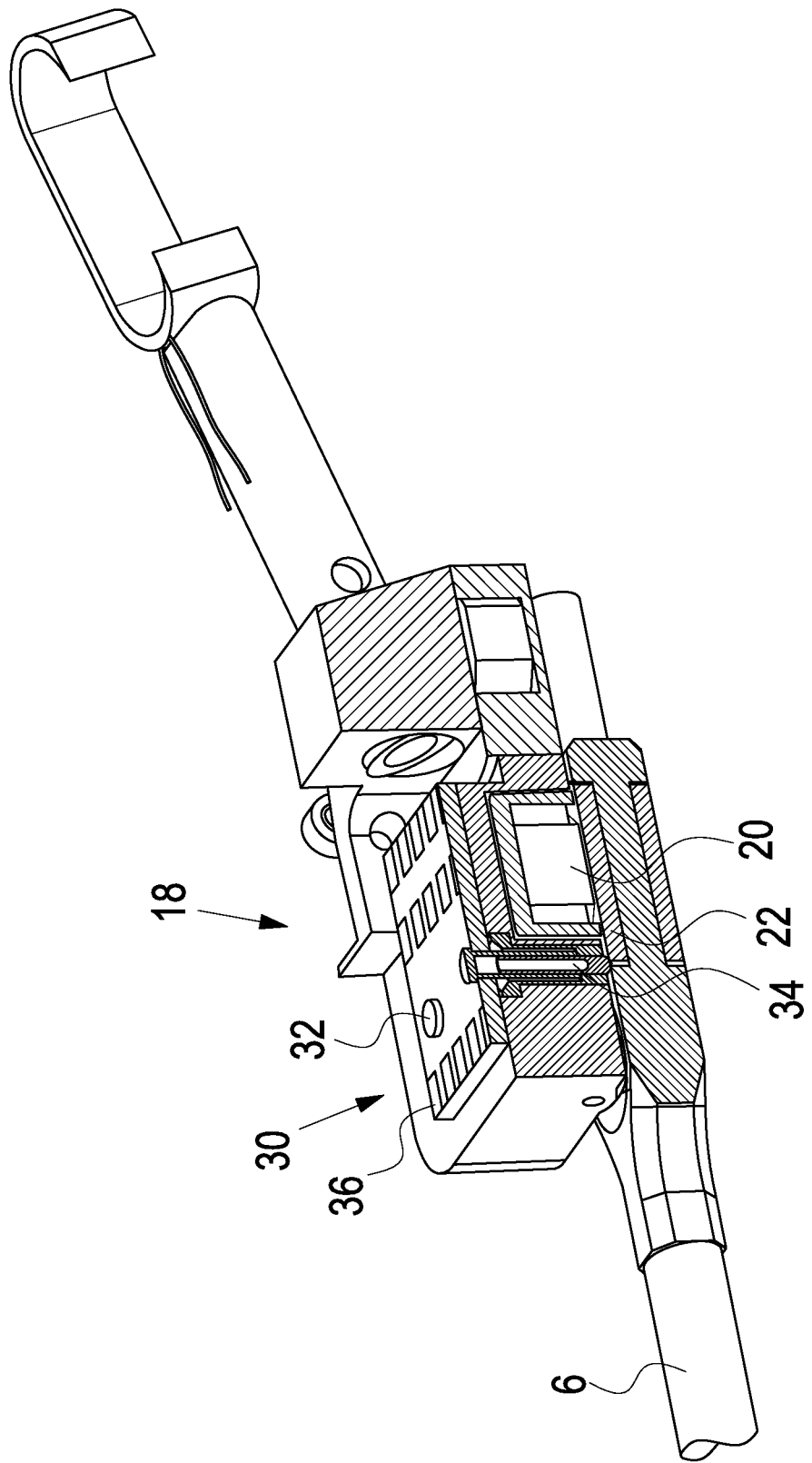

MEASURING APPARATUS FOR SURFACE OR CONTOUR MEASUREMENT

CROSS-REFERENCE TO RELATED APPLICATIONS

This application claims the priority of German Application No. 10 2018 103 420.2, filed Feb. 15, 2018, and which is incorporated herein by reference.

FIELD OF THE INVENTION

The invention relates to a measuring apparatus for surface or contour measurement on a workpiece.

BACKGROUND OF THE INVENTION

Measuring apparatuses of this type are generally known, and are used for various measuring tasks, in particular in the field of production measurement technology.

The known measuring apparatuses have a probe for contacting the surface of the workpiece to be measured, the probe having a holding part to which a probe arm is detachably connectable or connected. The known measuring apparatuses also have a feed apparatus for moving the probe element relative to the workpiece to be measured. Due to the detachable connection of the probe arm to the holding part, it is possible to use different probe arms for different measuring tasks. The known measuring apparatuses also have a control apparatus for controlling the feed apparatus.

During a measurement, the feed apparatus moves the probe together with the probe arm relative to the workpiece to be measured along an in particular linear feed axis. In the event of operating errors, the probe arm may collide with the workpiece to be measured or some other component of the measuring system. As a result, there is a risk that damage to the measuring apparatus, in particular the probe, and/or the workpiece may occur.

A measuring head is known from DE 39 22 296 A1 in which the probe arm is connected to the holding part via a permanent magnet. The holding force of the permanent magnet is set in such a way that in the event of a collision, the probe arm detaches from the holding part, thus forming an overload protector.

Similar overload protectors that operate with permanent magnets are also known from U.S. Pat. No. 4,574,625, EP 1 689 317 B1, EP 0 406 781 B1, DE 33 201 27, EP 1 289 317 A1, DE 10 2007 018 444 B3, WO 02/27270 A1, DE 10 2005 036 928 B3, DE 19617023 C1, U.S. Pat. No. 5,028, 901, EP 0 750 017 A2, DE 4437033 C2, WO 03/083407, and DE 10 2012 007 183 A1.

One disadvantage of such overload protectors is that in the event of a collision, the probe arm falls from the holding part and may be damaged when it drops.

To avoid this disadvantage, for connecting the probe arm to the holding part it is known to use a component that has a predetermined breaking point and that breaks when an overload occurs. Probe arms of this type are known from DE 19 502 840 A1, DE 42 17 641 A1, U.S. Pat. No. 5,394,757, EP 1 722 189 A1, U.S. Pat. Nos. 7,155,839 B2, and 8,524,523 A.

A measuring apparatus is known from EP 2 762 827 A1. In the known measuring apparatus, the collision protection is provided by an overload protector having a predetermined breaking point, the overload protector having a particularly advantageous design.

OBJECTS AND SUMMARY OF THE INVENTION

An object of the invention is to improve the collision protection for measuring apparatuses.

This object is achieved by the invention set forth herein.

Another object of the invention is to improve measuring apparatuses.

This object is achieved by the invention set forth herein.

The invention is based on the finding that after triggering of an overload protector based on holding by a permanent magnet or a predetermined breaking point arrangement, although the risk of damage to the probe arm is reduced, there is still the risk of other components of the measuring apparatus being damaged.

Proceeding from this idea, the invention is based on the concept of increasing the collision protection by detecting a collision of the probe arm with an obstacle, and when a collision is detected, intervening in the control of the measuring apparatus, for example stopping the feed apparatus.

For this purpose, the invention provides a position sensor means that is associated with the probe arm and connected to the control apparatus, and that is designed and configured in such a way that it detects changes in the position of the probe arm, relative to the holding part, from a measuring position into an interference position of the probe arm, when a change in position is detected, generates a position change signal, wherein the control apparatus is designed and programmed in such a way that, as a response to a position change signal, it generates a control signal for controlling the feed apparatus in such a way that the feed movement of the probe is influenced.

When the probe arm carries out a movement relative to the holding part during a collision, the position sensor means generates a position change signal, on the basis of which the feed movement of the probe is influenced by the control apparatus in a controlled manner. When a movement of the probe arm into the interference position is detected, for example and in particular the feed apparatus may be stopped so that the feed movement is then immediately ended.

The invention thus provides in particular an emergency stop in the event of a collision. As a result of it being possible to immediately end the feed movement in the event of a collision, for example, the risk of damage to the measuring apparatus is significantly reduced.

Since damage to the measuring apparatus and its components is thus avoided with a high degree of reliability, the invention saves on repair costs.

By appropriately setting the sensitivity of the position sensor means, it is possible according to the present invention to generate the position change signal when the probe arm has already moved slightly relative to the holding part due to a collision, but has not yet fallen from the holding part. Damage to the probe arm due to falling off is thus likewise avoided.

To bring about an emergency stop of the feed apparatus, one advantageous further embodiment of the invention provides that the control apparatus is designed and programmed in such a way that the feed apparatus is stopped as a response to a position change signal.

Another advantageous further embodiment of the invention provides that during an activation of the feed apparatus, the position sensor means is continuously in signal transmission connection with the control apparatus when carrying out a measurement. Continuous collision monitoring without time gaps is thus achieved during the measurement.

According to the invention, a probe arm is understood to mean a holding arrangement for holding a probe element, for example a probe tip, regardless of whether the holding arrangement is designed and shaped as an arm or in some other way.

Depending on the particular requirements, the position sensor means may have any desired number of sensors, whose arrangement on the measuring apparatus is selectable within wide limits, depending on the particular requirements. In this regard, one advantageous further embodiment of the invention provides that at least one sensor of the position sensor means is situated on the probe arm and/or the holding part.

In addition, the functional principle of the position sensor means is selectable within wide limits, depending on the particular requirements. In this regard, one advantageous further embodiment of the invention provides that the position sensor means has an electromechanical sensor means with at least one electromechanical sensor that is designed in such a way that, as a response to a movement of the probe arm relative to the holding part from the measuring position into an interference position, generates an electrical signal or a change in an electrical signal, wherein the electrical signal or the change in the electrical signal forms the position change signal. Electromechanical sensors of this type have a simple design and are therefore inexpensive, and have high reliability.

A further embodiment of the above-mentioned embodiment provides that at least one electromechanical sensor is designed in such a way that in the measuring position of the probe arm it generates a quiescent current that changes during a movement of the probe arm, relative to the holding part, from the measuring position into the interference position. The corresponding change in the quiescent current may be recognized in the control apparatus, and forms the position change signal. A movement of the probe arm into an interference position may thus be recognized with high reliability, using a simple means. A quiescent current having a low current intensity of a few milliamperes is sufficient, so that the resulting power consumption is negligible.

One advantageous further embodiment of the invention provides that at least one electromechanical sensor is designed in such a way that the quiescent current becomes zero during a movement of the probe arm relative to the holding part from the measuring position into the control position.

In order for the electromechanical sensor to have a particularly simple design, another advantageous further embodiment of the invention provides that at least one electromechanical sensor has two electrical contact elements, situated on the holding part, that are designed in such a way that in the measuring position of the probe arm they are bridged by a component, made of electrically conductive material, that is situated on the probe arm, and in an interference position of the probe arm the electrical connection between the contacts is interrupted.

In the above-mentioned embodiment, the contact elements may preferably be spring-loaded in the direction of the probe arm, as provided by one advantageous further embodiment.

The contact elements may be designed in particular as spring contact pins. Spring contact pins of this type are available as simple, inexpensive standard parts.

Another advantageous further embodiment of the invention provides that at least one electromechanical sensor is designed as a switch. In this embodiment, a switching signal of the switch forms the position change signal.

Another advantageous further embodiment of the invention provides that the position sensor means has an optical sensor means with at least one optical sensor. In this embodiment, changes in position of the probe arm from the measuring position into the interference position are optically detected.

Different optical sensor principles may be used in the above-mentioned embodiment. One advantageous further embodiment provides that at least one optical sensor is formed by a camera that is in data transmission connection with the control apparatus, wherein the control apparatus is designed and programmed in such a way that a relative movement of the probe arm from the measuring position into an interference position is recognized by evaluating camera images transmitted to the control apparatus, in such a way that the camera images form the position change signal. Changes in position of the probe arm may be detected with high accuracy and reliability by use of appropriate image processing and pattern recognition algorithms.

Another advantageous further embodiment of the invention provides that the probe arm in the measuring position is held on the holding part by a magnetic holding means. By appropriately setting the sensitivity of the position sensor means, it is possible to trigger the position change signal before the probe arm has detached from the holding part. The feed movement may thus be stopped before the probe arm falls off. The risk of damage to the probe arm is thus reduced.

Another advantageous further embodiment of the invention provides that the probe arm in the measuring position is supported on the holding part with static determinacy by means of a three-point support, wherein the three-point support preferably has three balls, situated on the holding part, which in the measuring position of the probe arm engage with prismatically shaped support recesses formed on the probe arm. In a kinematic reversal of this arrangement, the balls may be formed on the probe arm, and the support recesses may be formed on the holding part. However, providing the balls on the holding part has the advantage that the balls, which are manufactured with high precision, are provided only once, namely, on the holding part, while the support recesses are present on the respective probe arm.

The invention is explained in greater detail below based on one embodiment with reference to the appended highly schematic drawings. All features described, illustrated in the drawings, and claimed in the patent claims, alone or in any arbitrary suitable combination, constitute the subject matter of the invention, regardless of their recapitulation in the patent claims or their back-reference, and regardless of their description, or illustration in the drawings.

Relative terms such as left, right, up, and down are for convenience only and are not intended to be limiting.

BRIEF DESCRIPTION OF THE DRAWINGS

The figures show the following:

FIG. 4 shows, in the same illustration as in FIG. 2, the holding part together with the probe arm in the measuring position.

DETAILED DESCRIPTION OF THE INVENTION

An embodiment of a measuring apparatus according to the invention is explained in greater detail below with reference to FIGS. 1 through 4.

Figure 1:
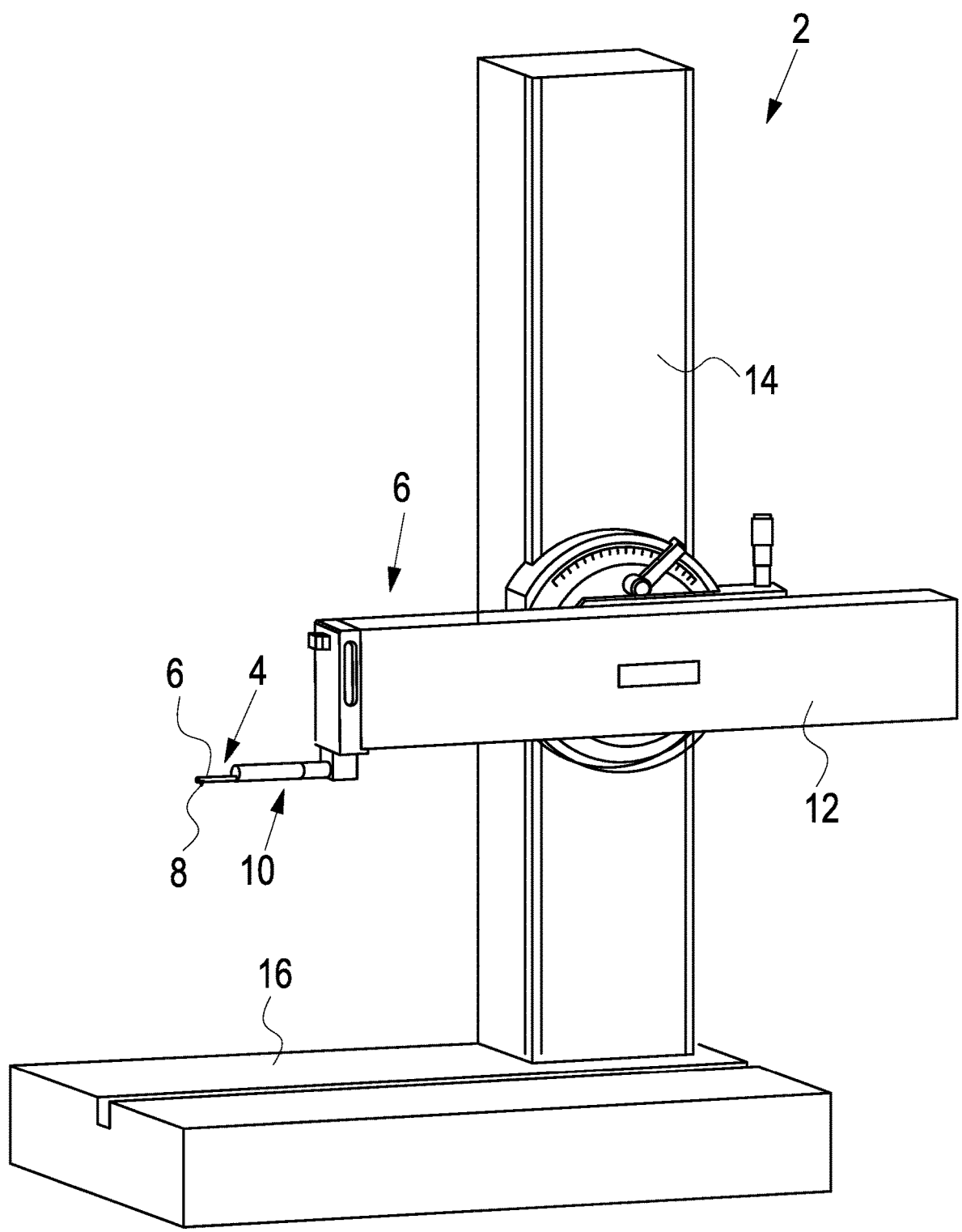
FIG. 1 shows a schematic perspective view of one embodiment of a measuring apparatus according to the invention.

FIG. 1 schematically illustrates one embodiment of a measuring apparatus 2 according to the invention for surface or contour measurement on a workpiece, having a probe 4 for contacting the surface of the workpiece to be measured, the probe having a probe arm 6 which on its free end bears a probe element, for example in the form of a probe tip.

The measuring apparatus 2 has a feed apparatus 10 for moving the probe relative to the surface to be measured. A control apparatus is provided for controlling the feed apparatus 10. The feed apparatus 10 is situated on a housing 12, which is situated on a measuring column 14 that is adjustable along a vertical axis and that is connected to a base plate 16 of the apparatus.

Figure 2:
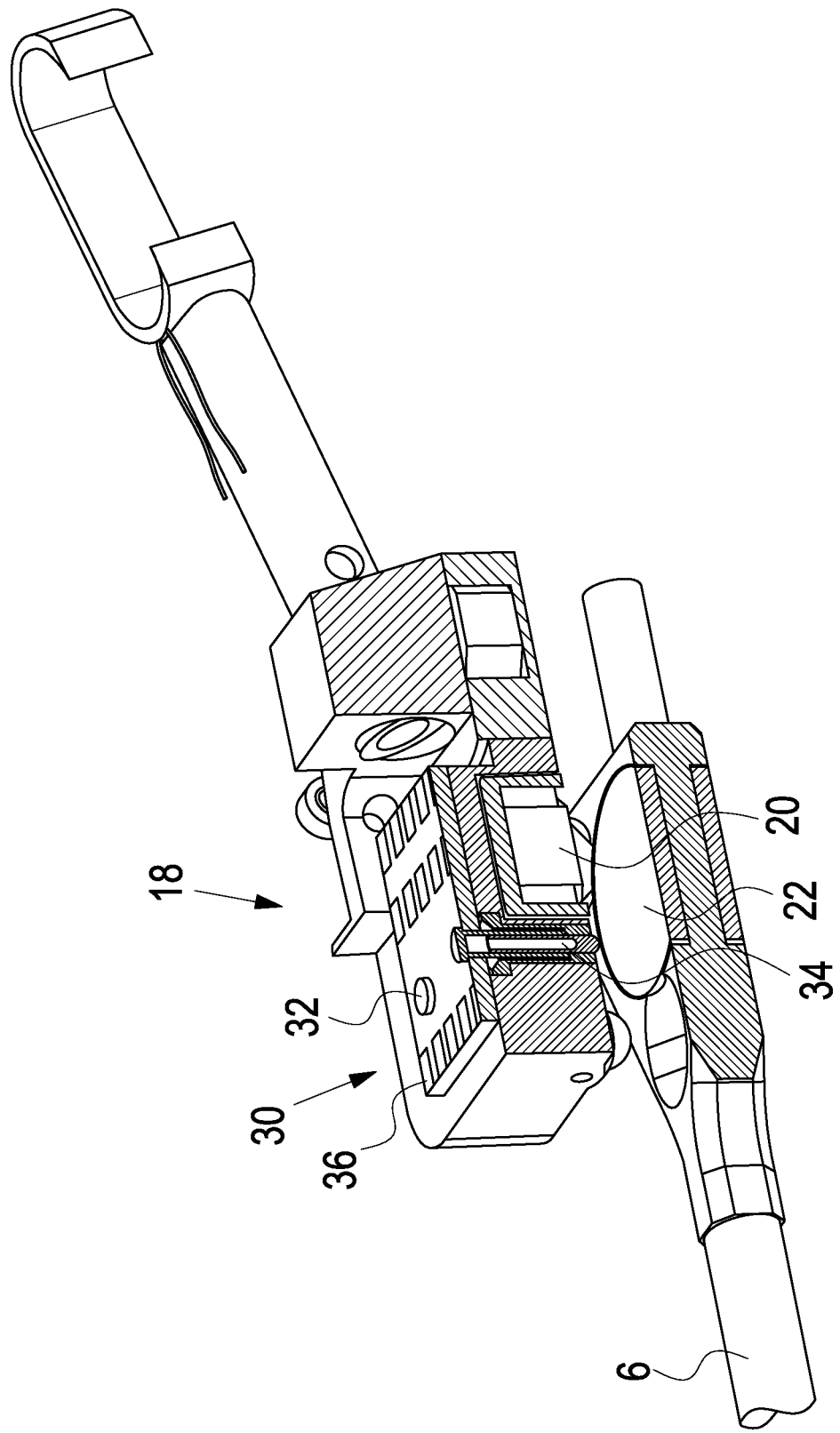
FIG. 2 shows a detail, in enlarged scale and a partially sectional perspective view, in the area of the connection between a probe arm and a holding part of the measuring apparatus according to FIG. 1.
Figure 3:
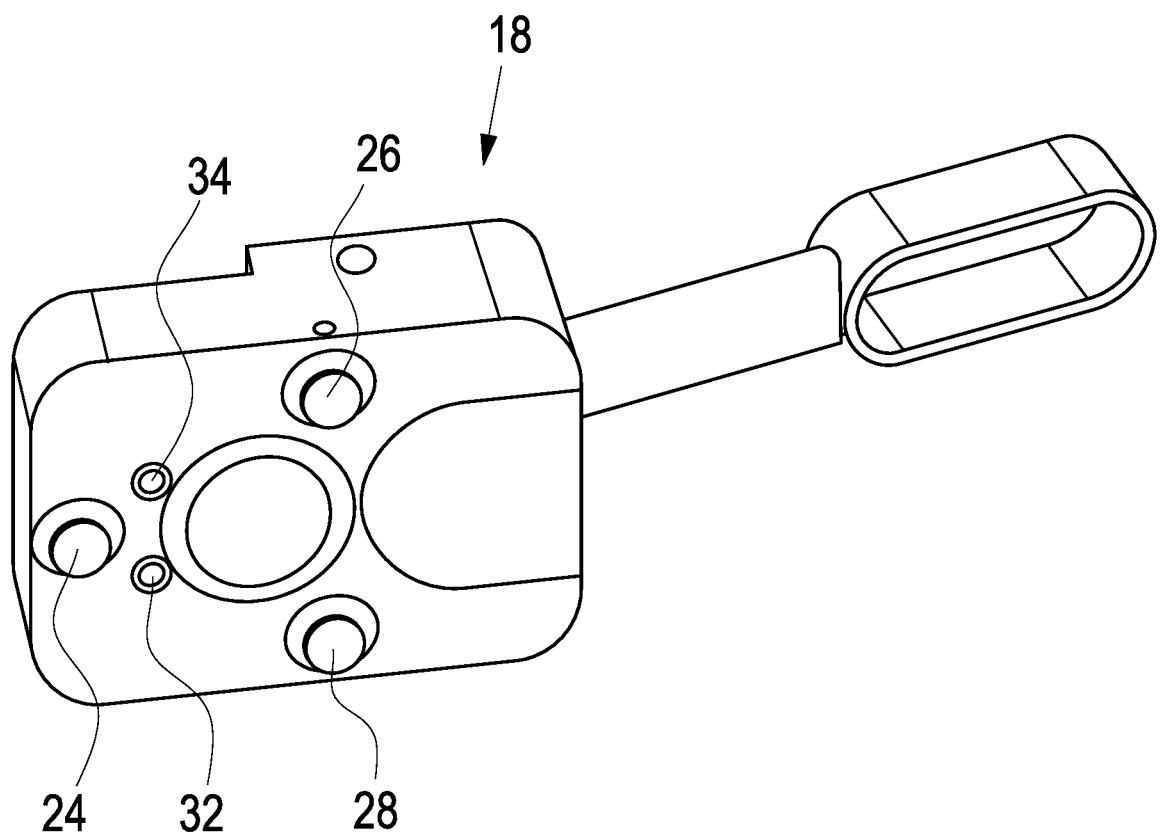
FIG. 3 shows another perspective view of the holding part by itself.

FIG. 2 illustrates a holding part 18 of the probe 4, to which the probe arm 6 is detachably connectable. For holding the probe arm 6 on the holding part 18 in a measuring position (see FIG. 4), a magnetic holding means is provided, which in this embodiment has a permanent magnet 20. The probe arm 6 on its end facing the holding part 18 has a plate 22 made of a ferromagnetic and electrically conductive material in the form of a metal plate. The plate 22 is thus used on the one hand to hold the probe arm 6 on the holding part 18 by a permanent magnet in the measuring position of the probe arm 6.

In the measuring position, the probe arm 6 is supported with static determinacy on the holding part 18 by means of a three-point support, wherein the three-point support 3 has balls 24, 26, 28, situated on the holding part, which in the measuring position of the probe arm 6 engage with prismatically shaped support recesses formed on the probe arm 6.

FIG. 4 shows the probe arm in its measuring position on the holding part 18.

According to the invention, the measuring apparatus 2 has a position sensor means that is associated with the probe arm 6 and connected to the control apparatus, and that is designed and configured in such a way that it detects changes in the position of the probe arm, relative to the holding part, from the measuring position, illustrated in FIG. 4, into an interference position of the probe arm 6, and when a change in position is detected, generates a position change signal, wherein the control apparatus is designed and programmed in such a way that, as a response to a position change signal, it generates a control signal for controlling the feed apparatus 10 in such a way that the feed movement of the probe 4 is influenced.

In the illustrated embodiment, the control apparatus is designed and programmed in such a way that the feed apparatus 10 is stopped as a response to a position change signal.

In the illustrated embodiment, the position sensor means has an electromechanical sensor means with at least one electromechanical sensor 30 that is designed in such a way that, as a response to a movement of the probe arm 6 relative to the holding part 18 from the measuring position into an interference position, generates an electrical signal or a change in an electrical signal, wherein the electrical signal or the change in the electrical signal forms the position change signal.

In the illustrated embodiment, the sensor 30 has two electrical contact elements 32, 34, situated on the holding part 18, that are designed in such a way that in the measuring position of the probe arm 6 they are bridged by a component, made of electrically conductive material, that is situated on the probe arm 6. In the illustrated embodiment, this component is formed by the plate 22.

In the illustrated embodiment, the contact elements 32, 34 are formed by spring contact pins that are spring-loaded in the direction of the probe arm 6, and that in the measuring position of the probe arm 6 rest against the plate 22 with elastic resiliency. A quiescent current is fed via a circuit board 36 that is connected to the holding part 18, the quiescent current flowing across the contact element 32 and the plate 22 to the contact element 34 as long as the probe arm 6 is in the measuring position.

If a collision of the probe arm 6 with an obstacle, for example the workpiece, results in a movement of the probe arm 6 relative to the holding part 18 from the measuring position into an interference position, the flow of the quiescent current is interrupted. Due to this change in the quiescent current, which becomes zero, it may be determined in the control apparatus that the probe arm 6 has moved into an interference position. The change in the quiescent current forms a position change signal, on the basis of which it may be determined in the control apparatus that a collision has occurred.

As a response to the position change signal, the control apparatus generates a control signal for controlling the feed apparatus 10 in such a way that the feed movement of the probe 4 is influenced. In the illustrated embodiment, the control apparatus is designed and programmed in such a way that the feed apparatus 10 is stopped as a response to a position change signal.

In this way, an emergency stop of the feed apparatus 10 is achieved in the event of a collision, thus reliably avoiding damage to the measuring apparatus 2 and the workpiece.

After an emergency stop has taken place, the cause of the interference may be eliminated, the probe arm 6 returned to the measuring position by an operator, and the measurement restarted or continued.

By an appropriately sensitive adjustment of the position sensor means, the control signal for controlling the feed apparatus 10 may already be generated for influencing the feed movement when only a slight displacement of the probe arm 6 relative to the holding part 18 has taken place. This ensures that the measurement continues only when the probe arm 6 is in the clearly defined measuring position relative to the holding part 18.

In the illustrated embodiment, the sensitivity of the sensor 30 may be set by adjusting the extent by which the contact elements 32, 34, with spring loading, protrude beyond the holding part 18. If a displacement of the probe arm 6 relative to the holding part 18 occurs, due to the prismatic shape of the support recesses into which the balls 24, 26, 28 engage, during a relative displacement the distance between the holding part 18 and the probe arm 8 also increases, so that the current flow across the contact elements 32, 34 and the plate 22 is interrupted. The position change signal is generated and the emergency stop is brought about in this way.

In the illustrated embodiment, the sensitivity of the sensor 30 may also be set, for example, by coating the plate 22 with an electrically insulating lacquer and leaving uncoated only the locations at which the contact elements 32, 34 rest against the plate 22 in the measuring position of the probe arm 6.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A measuring apparatus for surface or contour measurement on a workpiece, comprising:
   a) a probe for contacting the surface of the workpiece to be measured, the probe having a holding part to which a probe arm is detachably connectable or connected;
   b) a feed apparatus for moving the probe relative to the workpiece to be measured;
   c) a control apparatus for controlling the feed apparatus;
   d) a position sensor means that is associated with the probe arm and connected to the control apparatus, and that is designed and configured in such a way that it detects changes in the position of the probe arm, relative to the holding part, from a measuring position into an interference position of the probe arm, and when a change in position is detected, generates a position change signal; and
   e) the control apparatus is designed and programmed in such a way that, as a response to a position change signal, it generates a control signal for controlling the feed apparatus in such a way that the feed movement of the probe is influenced.

2. The measuring apparatus according to claim 1, wherein:
   a) the control apparatus is designed and programmed in such a way that the feed apparatus is stopped as a response to a position change signal.

3. The measuring apparatus according to claim 1, wherein:
   a) during an activation of the feed apparatus, the position sensor means is continuously in signal transmission connection with the control apparatus when carrying out a measurement.

4. The measuring apparatus according to claim 1, wherein:
   a) at least one sensor of the position sensor means is situated on the probe arm and/or the holding part.

5. The measuring apparatus according to claim 1, wherein:
   a) the position sensor means has an electromechanical sensor means with at least one electromechanical sensor that is designed in such a way that, as a response to a movement of the probe arm relative to the holding part from the measuring position into an interference position, generates an electrical signal or a change in an electrical signal, wherein the electrical signal or the change in the electrical signal forms the position change signal.

6. The measuring apparatus according to claim 5, wherein:
   at least one electromechanical sensor is designed in such a way that in the measuring position of the probe arm, a quiescent current flows that changes during a movement of the probe arm, relative to the holding part, from the measuring position into the interference position.

7. The measuring apparatus according to claim 6, wherein:
   a) at least one electromechanical sensor is designed in such a way that the quiescent current becomes zero during a movement of the probe arm relative to the holding part, from the measuring position into an interference position.

8. The measuring apparatus according to claim 5, wherein:
   a) at least one electromechanical sensor has two electrical contact elements, situated on the holding part, that are designed in such a way that in the measuring position of the probe arm they are bridged by a component, made of electrically conductive material, that is situated on the probe arm, and in an interference position the electrical connection between the contact elements is interrupted.

9. The measuring apparatus according to claim 8, wherein:
   a) at least one contact element is spring-loaded in the direction of the probe arm.

10. The measuring apparatus according to claim 9, wherein:
    a) at least one contact element is designed as a spring contact pin.

11. The measuring apparatus according to claim 5, wherein:
    a) at least one electromechanical sensor is designed as a switch.

12. The measuring apparatus according to claim 1, wherein:
    a) the position sensor means has an optical sensor means with at least one optical sensor.

13. The measuring apparatus according to claim 12, wherein:
    a) at least one optical sensor is formed by a camera that is in data transmission connection with the control apparatus, wherein the control apparatus is designed and programmed in such a way that a relative movement of the probe arm from the measuring position into an interference position is recognized by evaluating camera images transmitted to the control apparatus, in such a way that the camera images form the position change signal.

14. The measuring apparatus according to claim 1, wherein:
    a) the probe arm in the measuring position is held on the holding part by a magnetic holding means.

15. The measuring apparatus according to claim 1, wherein:
    a) the probe arm in the measuring position is supported on the holding part with static determinacy by means of a three-point support.

16. The measuring apparatus according to claim 15, wherein:
    a) the three-point support has three balls, situated on the holding part, which in the measuring position of the probe arm engage with prismatically shaped support recesses formed on the probe arm.

* * * * *